(12) United States Patent
Li et al.

(10) Patent No.: US 11,707,807 B2
(45) Date of Patent: Jul. 25, 2023

(54) FIXTURE FOR AUTOMATIC ASSEMBLY, OVERTURNING AND WELDING OF SIDEWALL ALUMINUM PROFILES OF RAIL VEHICLE

(71) Applicants: QINGDAO UNIVERSITY OF TECHNOLOGY, Shandong (CN); UNIVERSITY OF SHARJAH, Sharjah (AE)

(72) Inventors: Changhe Li, Qingdao (CN); Zhuang Shi, Qingdao (CN); Bo Liu, Qingdao (CN); Huajun Cao, Qingdao (CN); Wenfeng Ding, Qingdao (CN); Xin Cui, Qingdao (CN); Zafar Said, Sharjah (AE); Yanbin Zhang, Qingdao (CN)

(73) Assignees: QINGDAO UNIVERSITY OF TECHNOLOGY, Qingdao (CN); UNIVERSITY OF SHARJAH, Sharjah (AE)

( * ) Notice: Subject to any disclaimer, the term of this patent is extended or adjusted under 35 U.S.C. 154(b) by 0 days.

(21) Appl. No.: 17/829,602

(22) Filed: Jun. 1, 2022

(65) Prior Publication Data
US 2023/0046373 A1 Feb. 16, 2023

(30) Foreign Application Priority Data
Aug. 10, 2021 (CN) .......................... 202110912985.5

(51) Int. Cl.
*B23K 37/04* (2006.01)
*B23K 101/00* (2006.01)
*B23K 37/00* (2006.01)

(52) U.S. Cl.
CPC ...... *B23K 37/0452* (2013.01); *B23K 37/0426* (2013.01); *B23K 37/0435* (2013.01);
(Continued)

(58) Field of Classification Search
CPC ............ B23K 37/0452; B23K 37/0435; B23K 2101/006; B23K 37/0426; B23K 37/00; B23K 37/0252; Y02T 30/00
See application file for complete search history.

(56) References Cited

U.S. PATENT DOCUMENTS 6,578,247 B2 * 6/2003 Walker .................. B62D 65/02
29/281.4
6,615,478 B2 * 9/2003 Walker .................. B62D 65/02
29/559

(Continued)

*Primary Examiner* — Ryan J. Walters
(74) *Attorney, Agent, or Firm* — Oliff PLC

(57) ABSTRACT

Provided is a fixture for automatic assembly, overturning and welding of sidewall aluminum profile of a rail vehicle, comprising a lifting mechanism, a supporting overturning device mounted on the lifting mechanism, an automatic assembling sidewall profile device mounted on the supporting overturning device, and a self-positioning locking device. The automatic assembling sidewall profile device comprises a sidewall-shaped support steel beam, and a rodless cylinder track platform and a fixing seat. The self-positioning locking devices are mounted on the rodless cylinder track platform and the fixing seat, and have a self-positioning base and a locking device. The self-positioning base comprises an outer housing is provided with the locking device and two symmetrically set self-positioning supports, and faces of the two self-positioning supports matching with the rail vehicle aluminum profile are provided with rollers having a V-shaped gap formed therebetween.

8 Claims, 9 Drawing Sheets

(52) U.S. Cl.
CPC ........ *B23K 37/00* (2013.01); *B23K 2101/006* (2018.08); *Y02T 30/00* (2013.01)

(56) References Cited

U.S. PATENT DOCUMENTS

| | | | | |
|---|---|---|---|---|
| 6,708,394 | B2* | 3/2004 | Busnardo | B09B 3/00 |
| | | | | 29/559 |
| 6,859,989 | B2* | 3/2005 | Bauer | B23Q 1/52 |
| | | | | 29/559 |
| 8,616,825 | B2* | 12/2013 | Yamane | B64F 5/10 |
| | | | | 414/770 |
| 2002/0069531 | A1* | 6/2002 | Walker | B62D 65/02 |
| | | | | 29/897.2 |

\* cited by examiner $$\frac{A}{10:1}$$

FIXTURE FOR AUTOMATIC ASSEMBLY, OVERTURNING AND WELDING OF SIDEWALL ALUMINUM PROFILES OF RAIL VEHICLE

CROSS-REFERENCES TO RELATED APPLICATIONS

This application claims priority benefits to Chinese Patent Application No. 2021109129855, filed 10 Aug. 2021, the contents of which are incorporated herein by reference.

TECHNICAL FIELD

The present invention relates to the technical field of craft equipment, specifically to a fixture for automatic assembly, overturning and welding of sidewall aluminum profiles of rail vehicle.

BACKGROUND

Information of the related art part is merely disclosed to increase the understanding of the overall background of the present invention, but is not necessarily regarded as acknowledging or suggesting, in any form, that the information constitutes the prior art known to a person of ordinary skill in the art.

At present, in rail vehicles put into operation, a carriage structure using hollow extruded aluminum alloy profiles as a latest material is assembled and welded from integral extruded aluminum alloy profile with large longitudinal length. As one of the important structures of the carriage, a welding quality of the sidewall is directly related to whether the final structure of the carriage can meet the design and use requirements, and the sidewall also affects the life cycle of the high-speed train and the subsequent safe operation. The factors affecting the welding quality are: whether an oxide film at a bevel of the hollow extruded aluminum alloy profile is polished clean before welding; whether the hollow extruded aluminum alloy profile is assembled accurately without error; and whether the welding parameters can be accurately controlled during the welding. The control of the welding parameters is mainly controlled by welding manipulators, which can meet a precise control of the welding parameters.

For the factor of precision and error-free assembly of hollow extruded aluminum alloy profiles, the traditional assembly of profiles requires manual intervention. Firstly, lifting No. 1-5 profiles in turn to automatic welding reverse-position fixture, scribing on the profiles according to the drawing for positioning during assembly, then operators install the hollow extruded aluminum alloy profile after assisted in placing them on the assembly profile station, and start a pulling and bending device after checking that all sockets are free of misalignment, and adjust a compactor pressed on an upper side beam to ensure that the profiles can fit the positioning block, finally, put the compactor in a pressing state. The assembly and clamping process has a sequence, as the profiles are first mounted according to positioning method of scribing the auxiliary lines, and an installation sequence is an upper edge profile, an upper window profile, a window profile, a lower window profile and a lower edge profile, and an assembly benchmark is the previous profile in the installation sequence during the assembly. Since the method itself is manually involved, there will be errors generated, which will be further superimposed as the assembly benchmark changes, leading to uniformity of the weld seam during subsequent welding, thus affecting the overall structural strength of the sidewall. Although the step of clamping and welding being carried out after completing the installation of the profiles meets a logical relationship of assembling and welding, a utilization efficiency of time can still be improved, for obtaining greater time efficiency.

To sum up, for the traditional process of assembling sidewall profiles, the five profiles are lifted by the overhead crane and placed in the assembly station in turn, while the change of the assembly benchmark during assembly, together with the manual assisted assembly, can lead to an existence of assembly errors and the need to spend time on adjusting the assembled profiles. If the error has not been eliminated, the uniformity of the weld seam will be affected in the subsequent welding, thus reducing the overall structural strength of the sidewall, and causing serious accidents of structural damage of the body of the rail vehicle which is in operation. The welding process is reverse-position assembly and welding and then positive-position welding, between which the whole profile needs to be overturned, so that the sidewall is overturned into a positive position in the air, and lifted into the positive-position fixture. When the sidewall is lifted, there need at least three workers observe from different angles to avoid collision with the fixture. During the turning, the lower side of sidewall rotation needs to be protected by using nylon protection blocks, to prevent the sidewall profile from bending when turning, and need to pay attention to avoid the cable winding around the overturned; this process seriously consumes manpower and time, and there is also a high probability of deformation at the counter position welding. Because cooling is required after reverse welding, and there is no external force to fix the whole side wall during the period, resulting in weld cooling shrinkage deformation, subsequent secondary adjustment is required, resulting in triple consumption of manpower, financial resources, and time. Therefore, it is urgent to improve its process equipment.

SUMMARY

In order to solve the above-mentioned problems, the present invention provided a fixture for automatic assembly, overturning and welding of sidewall aluminum profiles of rail vehicle. The fixture for assembly, overturning and welding has two functions of assembly and overturning; and can assemble the profiles while the locking process is being carried out on the placed profiles, which not only makes the assembly between profiles precise, but also reduces the quantity of the assembly benchmark in the profile assembly, and further realizes a precise assembly. At the same time, the overturning function can make the reverse-position welded profile turn directly on the original station, which not only solves the problem of positioning, but also greatly releases the manpower and time, and eliminates the later secondary flame adjustment and repair process.

The present invention provides the following technical solutions:

The present invention provides a fixture for automatic assembly, overturning and welding of sidewall aluminum profile of rail vehicle, comprising a lifting mechanism, a supporting overturning device, an automatic assembling sidewall profile device and a self-positioning locking device.

The supporting overturning device is mounted on the lifting mechanism; the automatic assembling sidewall profile device is mounted on the supporting overturning device, and the automatic assembling sidewall profile device comprises a sidewall-shaped support steel beam and a rodless cylinder track platform and a fixing seat mounted on a top end of the sidewall-shaped support steel beam; the rodless cylinder track platform and fixing seat are mounted by the self-positioning locking device.

The self-positioning locking device comprises a self-positioning base and a locking device, the self-positioning base comprises an outer housing, two symmetrically set self-positioning supports are provided in the outer housing, and rollers are provided on the faces of the two self-positioning supports which match with the rail vehicle aluminum profile, and a V-shaped gap is formed between the rollers of the two self-positioning supports; the locking device is provided on one side of the outer housing.

As further embodiments, the locking device is a locking cylinder, and a hole is provided on the first side of the outer housing for a piston rod of the locking cylinder to pass through, so that the self-positioning locking device mounted on the profile can be locked after the profile is placed, thus ensuring the reliability, stability and accuracy of the profile when lifting, overturning and assembly.

As further embodiments, the automatic assembling sidewall profile device is mainly supported by a sidewall-shaped supporting steel beam as the main body, and the rodless cylinder track platform and the fixed seat are mounted on the sidewall-shaped supporting steel beam. Wherein, the design of the sidewall-shaped supporting steel beam is determined based on a cross-section of the sidewall profile assembly fitted with the self-positioning locking device. The rodless cylinder track platform acts as an active drive source for the assembly and precisely realizes the assembly of the profiles.

As further embodiments, the lifting mechanism comprises a first lifting mechanism and a second lifting mechanism with the same structure, and the two ends of the supporting overturning device are fixed to the first lifting mechanism and the second lifting mechanism respectively.

As further embodiments, the first lifting mechanism and the second lifting mechanism are sprocket chain lifting mechanisms.

As further embodiments, the supporting overturning device comprises a first supporting overturning mechanism and a second supporting overturning mechanism with the same structure, the first supporting overturning mechanism is mounted on the first lifting mechanism, and the second supporting overturning mechanism is mounted on the second lifting mechanism.

As further embodiments, the first supporting overturning mechanism and the second supporting overturning mechanism each respectively comprises a motor, the motor is connected to a coupling, the coupling driving a shaft to rotate, the shaft driving a sun gear to rotate; a large gear ring is stationary, planetary gears mounted between the large gear ring and the sun gear and moving in a circular motion around the sun gear, the planetary gears being set 120° apart from each other along the circumferential direction, a turntable is connected to the planetary gears, and a supporting overturning connector is fixedly connected to the turntable to realize the rotation of the supporting overturning connector.

The Beneficial Effects of the Present Invention are as Follows:

1. The present invention provided a fixture for assembly, overturning and welding of the aluminum profile of rail vehicle, being able to integrate the positive- and negative-position fixture in one station, canceling the lifting overturning device, and adopting a new overturning device instead, which can realize the overturning in the process of clamping, reduce the re-positioning and cancel the secondary adjustment. It has greatly released manpower and reduced the consumption of financial resources and time.

2. The automatic assembling sidewall profile device in the present invention can realize the assembly of sidewall profiles under full automation, and realize the precise assembly at the grooves of profiles through the rodless cylinder, which has not only met the welding requirements, but reduced the amount of changes of the assembly benchmark and the accumulation of errors.

3. In the present invention, a cooperation of the self-positioning base of the self-positioning locking device and the bottom of the positioning device at both ends of the sidewall aluminum profile, is able to realize a precise positioning of each profile on each self-locating locking device respectively, and a fixing and locking through the locking cylinder, there facilitates the assembly and turning of the subsequent devices and the preparation of program of the working position of the welding manipulator after having an accurate position relationship.

4. The present invention provided a fixture for assembly, overturning and welding of the aluminum profile of rail vehicle, being able to realize automatic and accurate assembly of profiles, having eliminated manual and reduced the assembly benchmark, having improved the assembly accuracy and being more conducive to welding.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

Rail vehicle aluminum profile self-positioning handling equipment I, closed-loop grinding control system II, ground III, rail vehicle sidewall hollow extruded aluminum alloy profile assembly IV, self-positioning device V, aluminum profile grinding and positioning clamping fixture VI and fixture for automatically assembly welding aluminum profiles and positive- and negative-positions overturn of assembled aluminum profile VII.

Upper side-beam profile IV-1, window upper profile IV-2, window middle-part profile IV-3, window lower profile IV-4 and lower side-beam profile IV-5.

Chain VII-1-1, upper sprocket VII-1-2, lower sprocket VII-1-3, worm gear reducer VII-1-4, motor VII-1-5 and supporting overturning device VII-2.

Motor VII-2-1, motor bracket VII-2-2, stepped shaft VII-2-3, outer housing plate VII-2-4, intermediate clamp plate VII-2-5, sun gear VII-2-6, planetary gear VII-2-7, large gear ring VII-2-8, turntable VII-2-9 and supporting overturning connector VII-2-10.

Sidewall-shaped supporting steel beam VII-3-1, rodless cylinder track platform VII-3-2, fixing base VII-3-3 and self-positioning locking device VII-4.

Self-positioning locking base VII-4-1, hexagonal countersunk head screw VII-4-2, locking cylinder connecting plate VII-4-3, hexagonal countersunk head screw VII-4-4 and locking cylinder VII-4-5.

DETAILED DESCRIPTION

Figure 1:
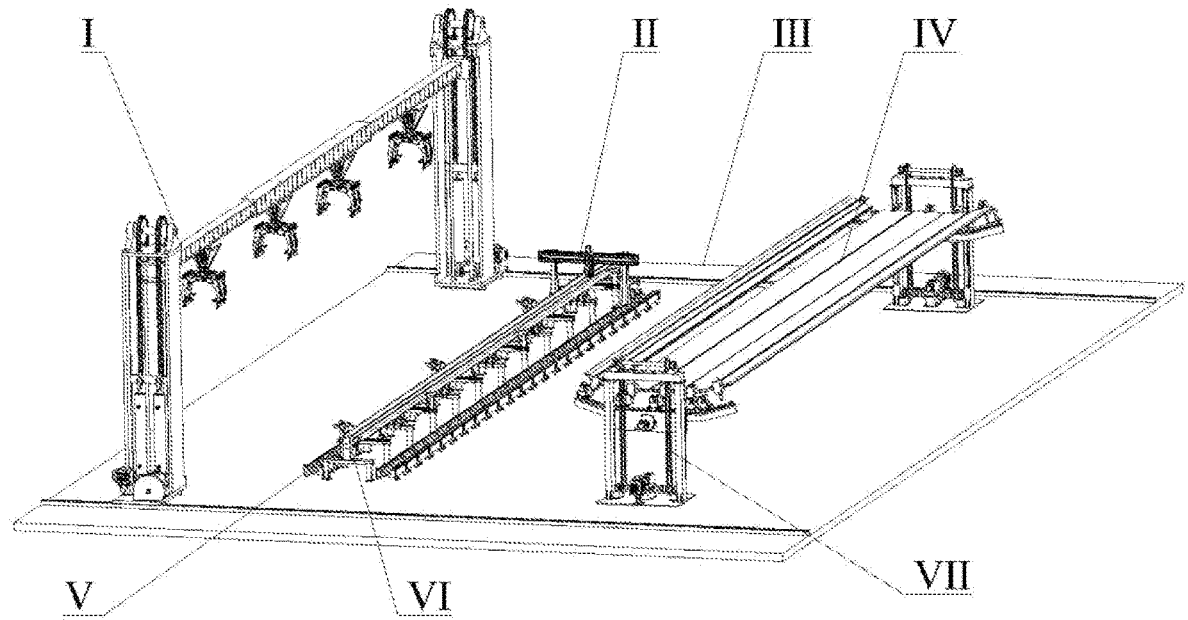
FIG. 1 is an overall schematic diagram of an Embodiment 1 of the present invention.

FIG. 1 is an overall schematic diagram, and as shown in the figure, there mainly comprises a rail vehicle aluminum profile self-positioning handling equipment I, a closed-loop grinding control system II, the ground III, a rail vehicle sidewall hollow extruded aluminum alloy profile assembly IV, a self-positioning device V, an aluminum profile grinding and positioning clamping fixture VI and a fixture for automatically assembly welding aluminum profiles and positive- and negative-positions overturn of assembled aluminum profile VII.

Figure 2:
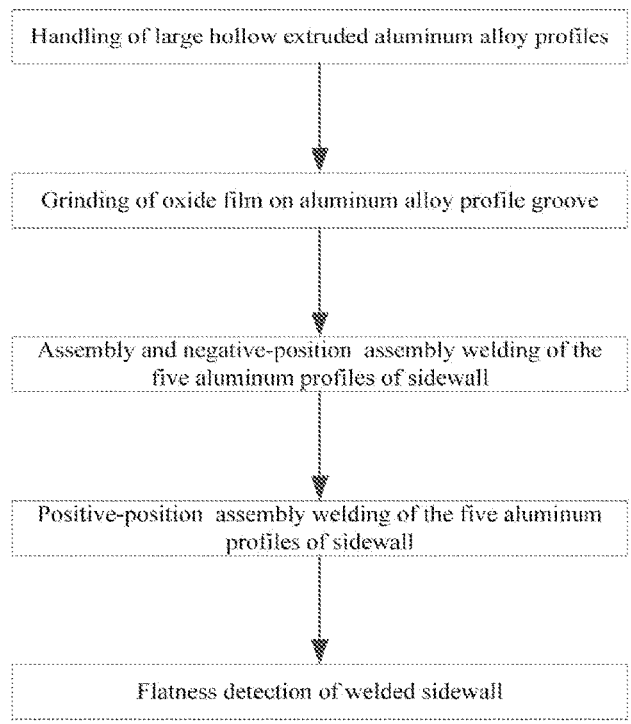
FIG. 2 is a flow chart of manufacturing processes of a sidewall of the rail vehicle body in the Embodiment 1 of the present invention.

FIG. 2 is a flow chart of manufacturing processes of a sidewall of the rail vehicle body, and as shown in the figure, a first step of the traditional sidewall manufacturing process is: clamping and taking a hollow extruded aluminum alloy profile having processed grooves from a material rack by using a lifting device and hoisting and placing to an aluminum profile grinding station; a second step of the process is: carrying out a grinding treatment of oxide film for the grooves of hollow extruded aluminum alloy profile; a third step of the process is: by using the lifting device, hoisting and placing the hollow extruded aluminum alloy profile finishing the burnishing to a negative-position automatic welding station for carrying out the assembly and automatic welding of the profile; a fourth step of the process is: after finishing the negative-position automatic welding, turning over a whole of the sidewall hollow extruded aluminum alloy profile set by using a crane lifting device, and then hoisting and placing the whole to a positive-position automatic welding station after the turning is completed; a fifth step of the process is: conducting a flatness inspection for the sidewall finishing the welding of whole.

The above is the traditional sidewall manufacturing process, wherein in the process step 1, the hoisting and transporting of the traditional crane requires greatly manual assistance; in the process step 2, the traditional grinding fixture has no application of clamping force, and the grinding is a manual grinding; in the process step 3, the traditional assembly process is to assemble the five hollow extruded aluminum alloy profiles manually; in the process step 4, in turning over of the overall sidewall hollow extruded aluminum alloy profile assembly, there must also be manually involved in an installation and disassembly in the turning over. Therefore, the device described next is a modification of an automation level for the traditional process mentioned above.

Figure 3:
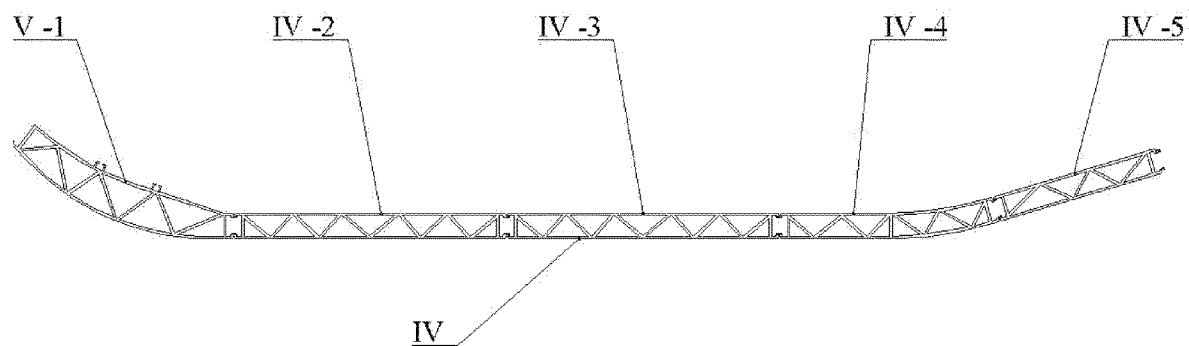
FIG. 3 is a front view of a hollow extruded aluminum alloy profile assembly IV of the rail vehicle sidewall in the Embodiment 1 of the present invention.

FIG. 3 is a front view of a hollow extruded aluminum alloy profile assembly IV of the rail vehicle sidewall, and as shown in the figure, the sidewall of the rail vehicle is mainly composed of five hollow extruded aluminum alloy profiles with different cross-sections, comprising an upper side-beam profile IV-1, a window upper profile IV-2, a window middle-part profile IV-3, a window lower profile IV-4 and a lower side-beam profile IV-5, which together form the sidewall structure of the rail vehicle body.

Figure 4:
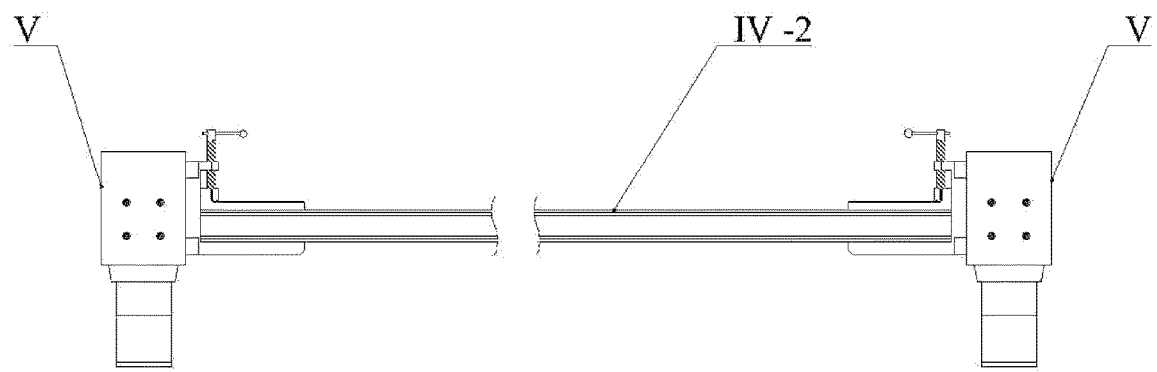
FIG. 4 is a broken view of a window upper profile IV-2 mounted with self-positioning device V in the Embodiment 1 of the present invention.

FIG. 4 is a broken view of a window upper profile IV-2 mounted with self-positioning device V, and as shown in the figure, self-positioning devices V are mounted on each side of the long hollow extruded aluminum alloy profile. The self-positioning devices V on both sides are coaxial in a longitudinal direction of the hollow extruded aluminum alloy profile (i.e., the direction of the long side of the profile), so that the relative positions of the self-positioning devices V and the window upper profile IV-2 are fixed and there is a definite position relationship between them. For the other four profiles in the rail vehicle sidewall hollow extruded aluminum alloy profile assembly IV, the installation methods thereof are same and there is also a definite position relationship between them.

Figure 5:
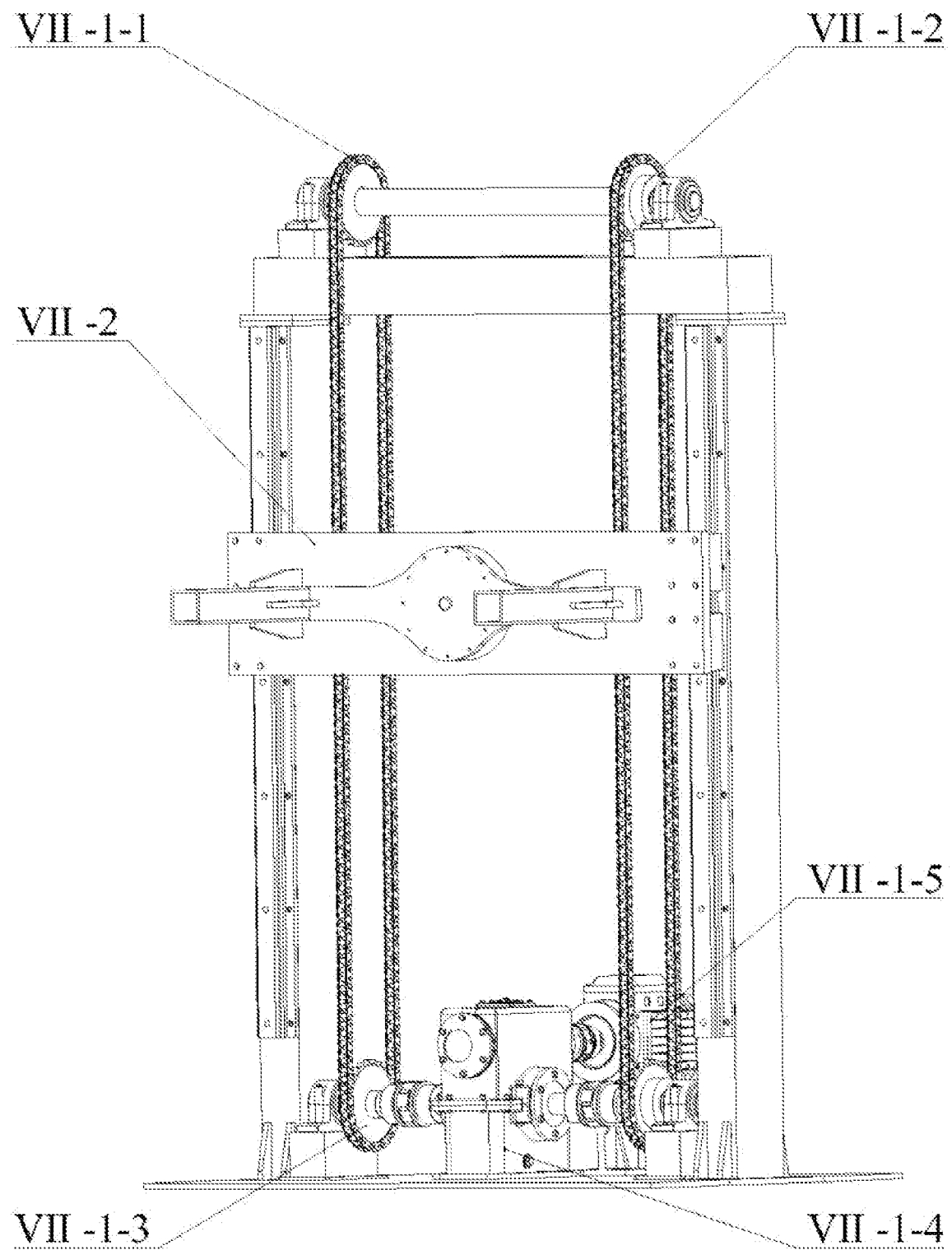
FIG. 5 is an axonometric view of a lifting mechanism VII-1 in a fixture for automatically assembly welding aluminum profiles and positive- and negative-positions overturn of assembled aluminum profile VII in the Embodiment 1 of the present invention.

FIG. 5 is an axonometric view of a lifting mechanism VII-1 in the fixture for automatically assembly welding aluminum profiles and positive- and negative-positions overturn of assembled aluminum profile VII, and as shown in the figure, the lifting mechanism VII-1 comprises a chain VII-1-1, an upper sprocket VII-1-2, a lower sprocket VII-1-3, a worm gear reducer VII-1-4, a motor VII-1-5 and a supporting overturning device VII-2. The motor VII-1-5 is connected to an input shaft of the worm gear reducer VII-1-4 through a coupling. When the motor VII-1-5 rotates, an output of torque is increased through the worm gear reducer VII-1-4, and the torque is transmitted to the two lower sprockets VII-1-3. The torque is transferred between the lower sprocket VII-1-3 and the upper sprocket VII-1-2 by the chain VII-1-1, and the supporting overturning device VII-2 is connected with the chain VII-1-1. Therefore, when the chain VII-1-1 is in motion, the up and down lifting of the supporting overturning device VII-2 connected to the chain VII-1-1 is realized.

Figure 6:
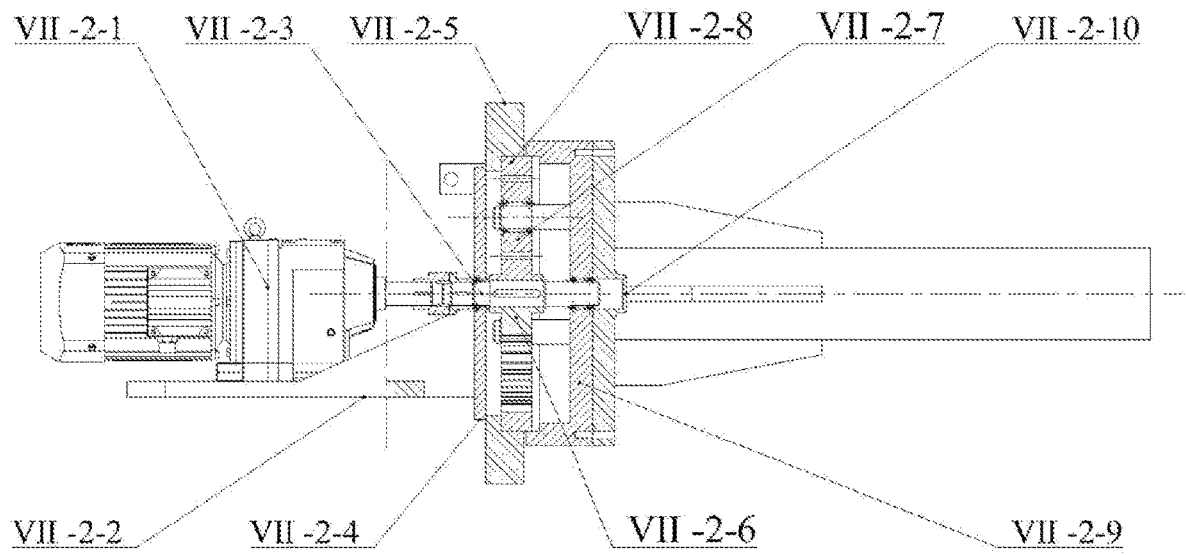
FIG. 6 is a semi-sectional view of a supporting overturning device VII-2 in the fixture for automatically assembly welding aluminum profiles and positive- and negative-positions overturn of assembled aluminum profile VII in the Embodiment 1 of the present invention.

FIG. 6 is a semi-sectional view of the supporting overturning device VII-2 in the fixture for automatically assembly welding aluminum profiles and positive- and negative-positions overturn of assembled aluminum profile VII, and as shown in the figure, the supporting overturning device VII-2 comprises a motor VII-2-1, a motor bracket VII-2-2, a stepped shaft VII-2-3, a housing version VII-2-4, an intermediate clamp VII-2-5, a sun gear VII-2-6, planetary gears VII-2-7, a large gear ring VII-2-8, a turntable VII-2-9 and a supporting overturning connector VII-2-10. When the motor VII-2-1 mounted on the motor bracket VII-2-2 rotates, the torque is transmitted to the stepped shaft VII-2-3 through the coupling, and the stepped shaft VII-2-3 transmits the torque to the sun gear VII-2-6; the large gear ring VII-2-8 is stationary, when the sun gear VII-2-6 rotates, it drives the planetary gears VII-2-7 to do a circular motion, so as to realize the rotation of the turntable VII-2-9 and drive the supporting overturning connector VII-2-10 to rotate. Wherein, the planetary gears vii-2-7 are three and arranged at intervals of 120° around the circumference in order to make the device work stably and balance the force.

Figure 7:
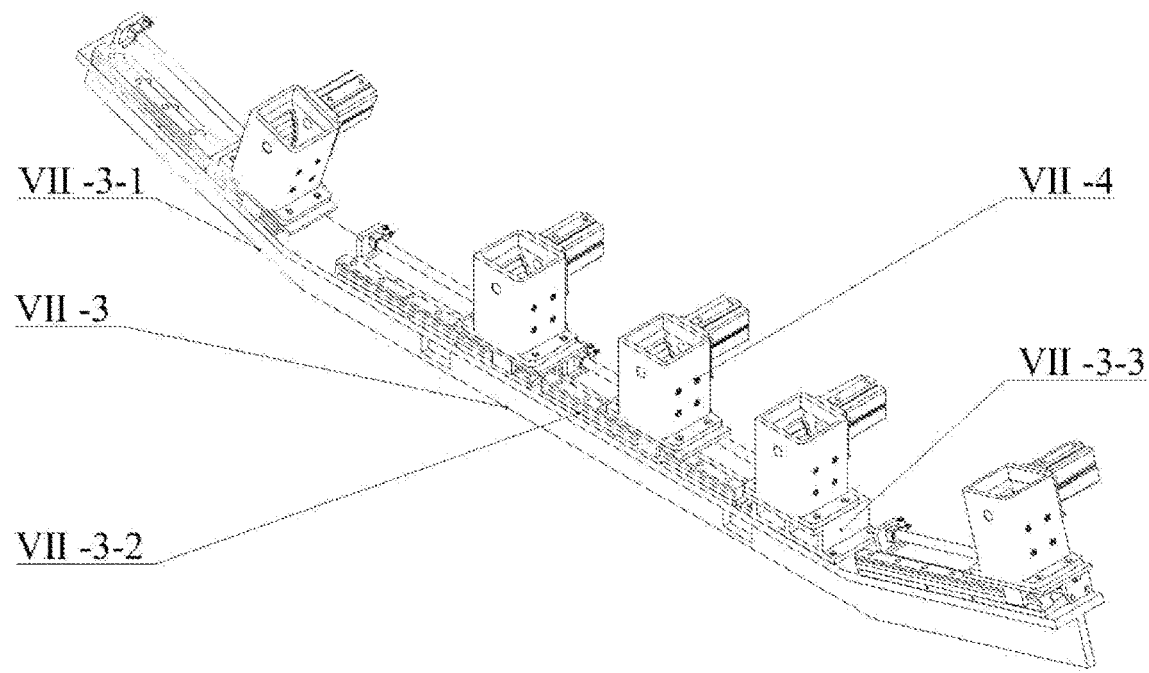
FIG. 7 is an axonometric view of an automatic assembling sidewall profile device VII-3 and a self-positioning locking device VII-4 in the Embodiment 1 of the present invention.

FIG. 7 is an axonometric view of automatic assembling sidewall profile device VII-3 and self-positioning locking device VII-4, and as shown in the figure, there comprises a sidewall-shaped supporting steel beam VII-3-1, a rodless cylinder track platform VII-3-2, a fixed seat VII-3-3 and self-positioning locking devices VII-4. Wherein, one self-positioning locking device VII-4 is fixed on the fixing base VII-3-3 by screws, and the other four self-positioning locking devices VII-4 are fixed on the rodless cylinder track platform VII-3-2 by screws; corresponding to the attached figure, start from a left side of FIG. 7 to right, the fourth self-positioning locking device VII-4 is fixed on the fixing base VII-3-3, and the other four self-positioning locking devices VII-4 are fixed respectively on the rodless cylinder track platform VII-3-2 by screws. The reason and purpose of this design is: The traditional assembly sequence of profile is assembling from the upper side-beam profile IV-1, the window upper profile IV-2, the window middle profile IV-3, the window lower profile IV-4 and the lower side-beam profile IV-5 in order, or assembling from the lower side-beam profile IV-5, the window lower profile IV-4, the window middle profile IV-3, the window upper profile IV-2 and the upper side-beam profile W-1 in order. Both the two assembly sequences are that fixing the profile at one end and then assemble the rest in turn, so that the assembly benchmark of each profile needs to be changed, and the assembly benchmark needs to be changed four times; if there is an error in the assembly, the error will therefore also accumulate. However, choosing a profile in the middle as the fixed one, the both sides of this profile can be used as the assembly benchmark, thus reducing the amount of changes of the assembly benchmark, which only needs to be changed 3 times, and improving the assembly accuracy.

Figure 8:
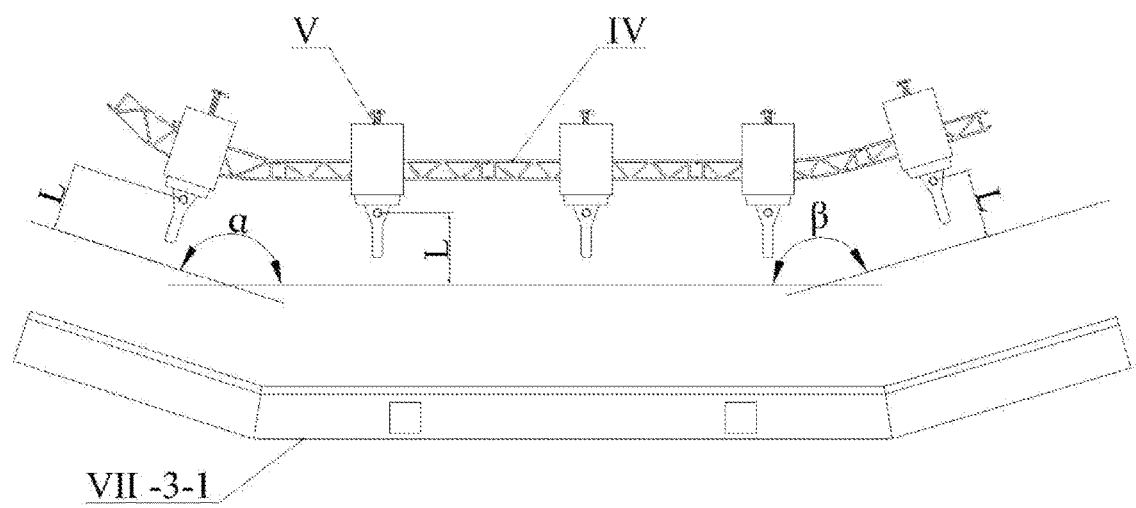
FIG. 8 is a geometric analysis diagram when designing a sidewall-shaped supporting steel beam VII-3-1 in the Embodiment 1 of the present invention.

FIG. 8 is a geometric analysis diagram when designing a sidewall-shaped supporting steel beam VII-3-1, and as shown in the figure, it can be seen from the cross-sectional shape of the rail vehicle sidewall hollow extruded aluminum alloy profile assembly IV that, the upper side-beam profile IV-1 and the window lower profile IV-4 are curved profiles, and the window upper profile IV-2, the window middle profile IV-3 and the lower side-beam profile IV-5 are flat profiles. According to placing positions of the five profiles and placing positions of the self-positioning devices V on the five profiles, taking a position with a distance L from a locking hole V-1-3 on a housing V-1 of the self-positioning device V, and on the position, make a straight line perpendicular to a self-positioning head V-1-2 on the housing V-1 of the self-positioning device V, and intersecting three lines which are made, so that obtained angles of intersection respectively are α and β; and according to a shape of the three lines, designed a geometry of the sidewall-shaped supporting steel beam VII-3-1.

Figure 9:
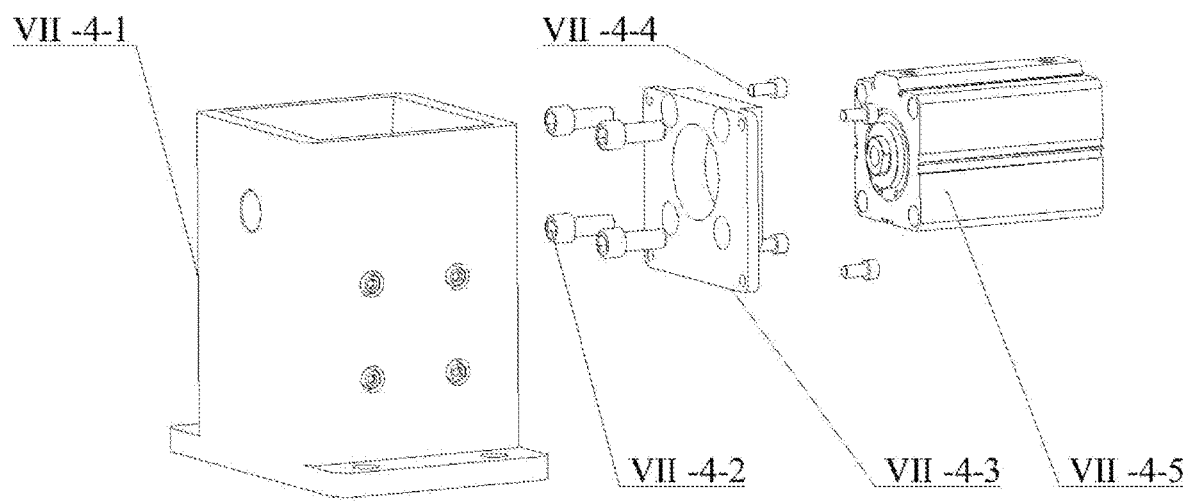
FIG. 9 is a partial exploded view of the self-positioning locking device VII-4 in the Embodiment 1 of the present invention.

FIG. 9 is a partial exploded view of the self-positioning locking device VII-4, and as shown in the figure, there comprises a self-positioning locking base VII-4-1, hexagon socket countersunk head screws VII-4-2, a locking cylinder connecting plate VII-4-3, hexagon socket countersunk head screws VII-4-4 and a locking cylinder VII-4-5. Wherein, internal assembly parts and assembly methods of the self-positioning locking base VII-4-1 are completely consistent with the internal assembly parts and assembly methods of the self-positioning device V, and the specific structure thereof can be seen in FIGS. 10 and 11; the hexagon socket countersunk head screws VII-4-2 fixedly connect the locking cylinder connecting plate VII-4-3 with the locking cylinder VII-4-5, and then the locking cylinder connecting plate VII-4-3 is fixedly mounted on the self-positioning locking base VII-4-1 through the hexagon socket countersunk head screws VII-4-4. When the self-positioning device V is placed in the self-positioning locking device VII-4, the locking hole of the self-positioning device V is in a coaxial position with a locking hole of the base of the self-positioning locking device VII-4; at this time, the locking cylinder VII-4-5 works and pushes a cylinder piston to insert into the two locking holes, to lock the position.

Figure 10:
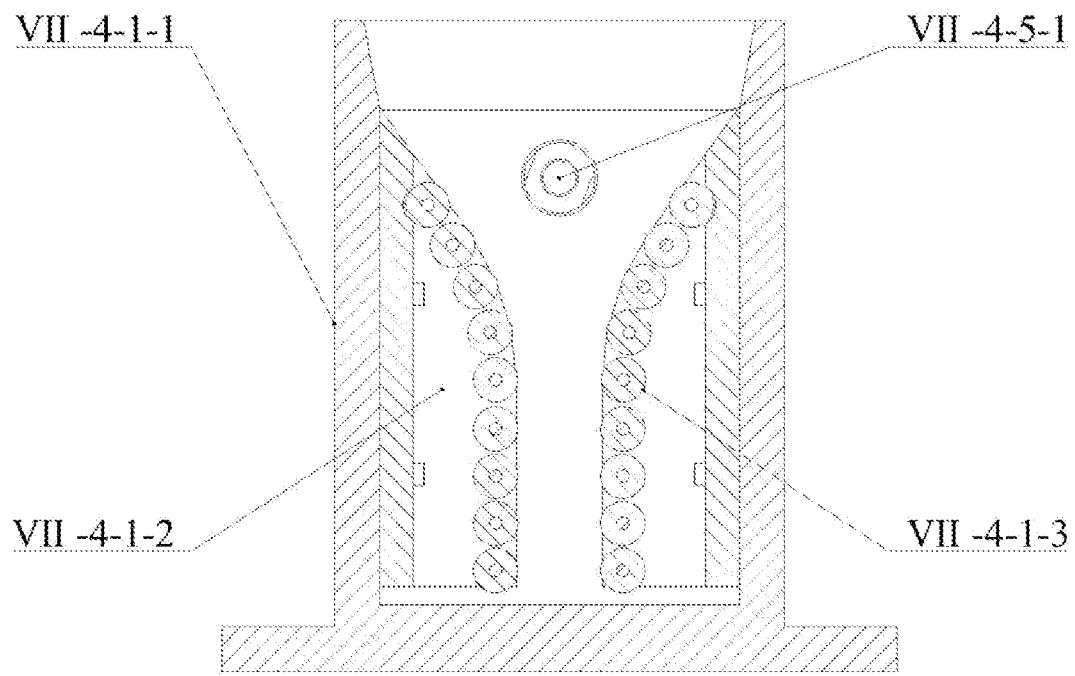
FIG. 10 is a structural schematic diagram of a self-positioning locking base VII-4-1 in the Embodiment 1 of the present invention.
Figure 11:
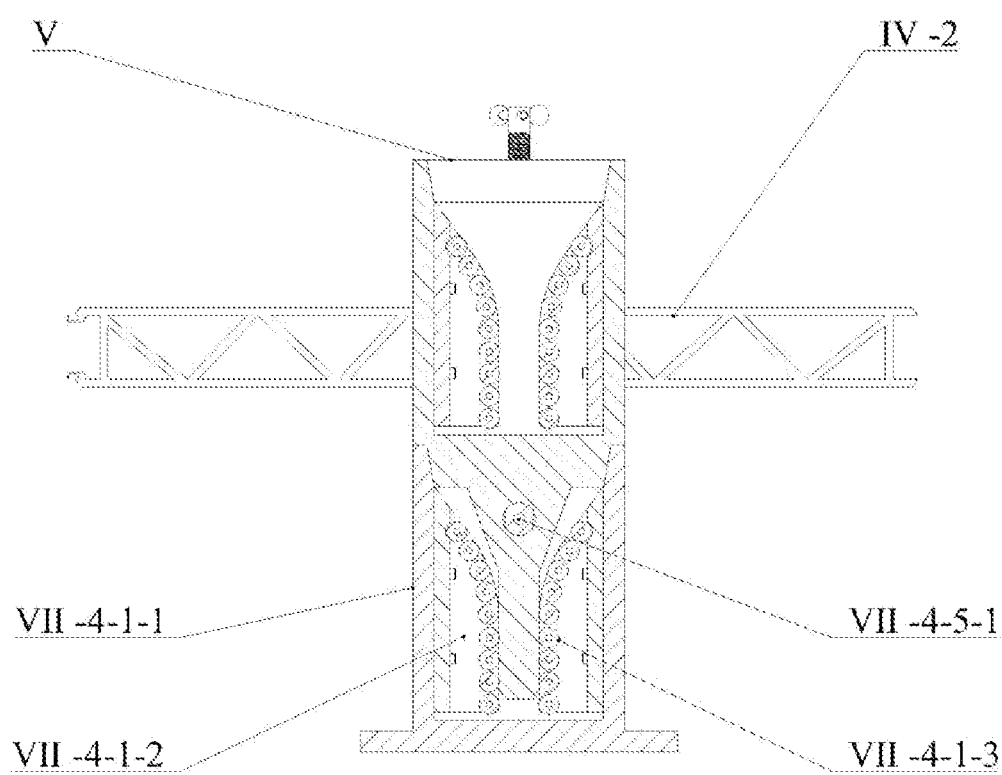
FIG. 11 is a structural schematic diagram of a self-positioning device V mounted with the window upper profile IV-2 placing on the self-positioning locking device VII-4 in the Embodiment 1 of the present invention.

As shown in FIG. 10, the self-positioning locking base VII-4-1 comprises a self-positioning locking base housing VII-4-1-1, two self-positioning supports VII-4-1-2 and several rollers VII-4-1-3. The rollers VII-4-1-3 are mounted on a working surface of the self-positioning support VII-4-1-2, and then the two self-positioning supports VII-4-1-2 are mounted respectively on both sides of an inner wall of the self-positioning locking base housing VII-4-1-1. As shown in FIG. 11, the window upper profile IV-2 mounted with the self-positioning device V is mounted on the self-positioning locking device VII-4, and an upper and lower locking fixation of the two-part structures is carried out through a piston VII-4-5-1 extended out from the locking cylinder VII-4-5 in the self-positioning locking device VII-4.

Figure 12:
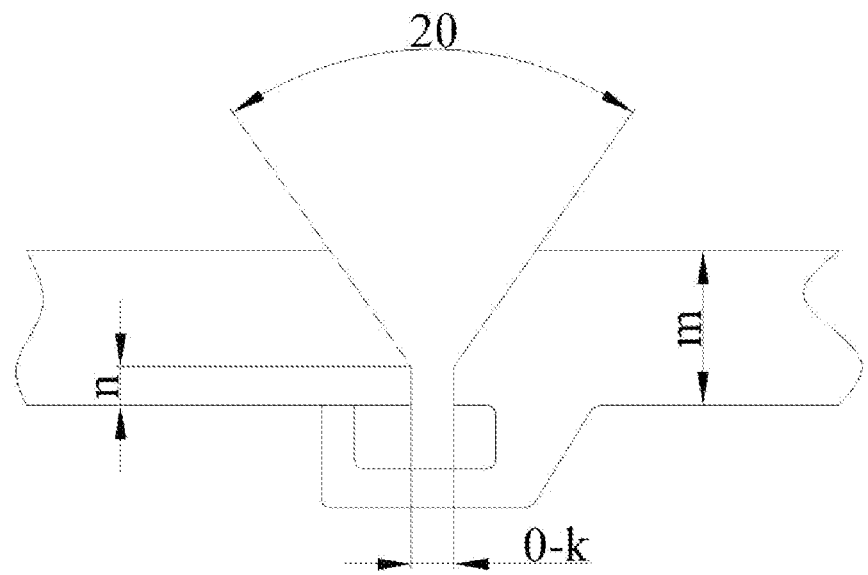
FIG. 12 is a specific geometric value diagram of installation between each two of the hollow extruded aluminum alloy profiles in the embodiment 1 of the present invention.
Figure 13:
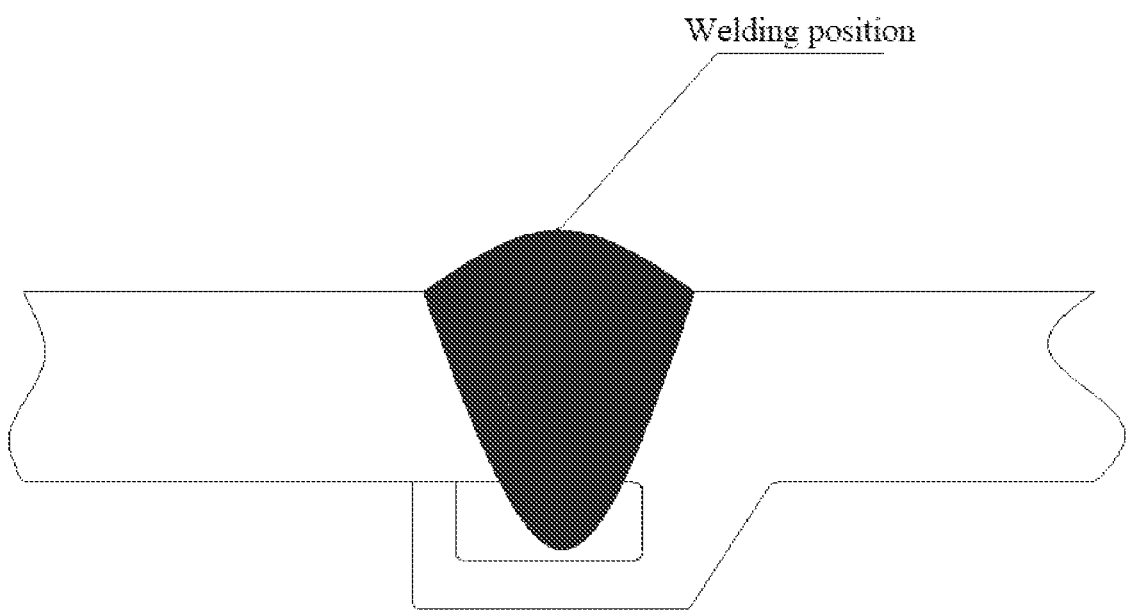
FIG. 13 is a location diagram of welding coverage in the Embodiment 1 of the present invention.

FIGS. 12 and 13 respectively are the specific geometric value diagram of installation between each two of the hollow extruded aluminum alloy profiles and the location diagram of welding coverage. As shown in FIG. 12, a form of weld seam between profiles is a V-shaped weld seam, an included angle between each two grooves is 2θ, a horizontal distance between weld seams needs to be kept between 0-k, and the weld seam in a vertical direction is full contact with the distance is 0. After the determined geometric relationship is maintained, the welding position and coverage size can be seen according to FIG. 13. In order to ensure a good welding coverage position, the profile installation must be very accurate, and the welding can be carried out only after meeting the geometric value relationship in FIG. 12.

Figure 14:
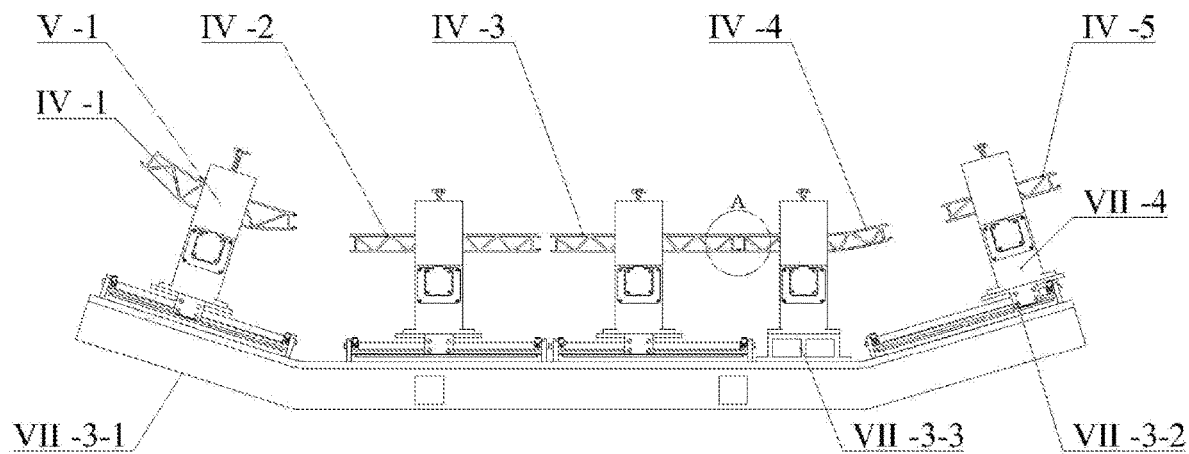
FIG. 14 is an assembly diagram of the sidewall profiles in the Embodiment 1 of the present invention.
Figure 15:
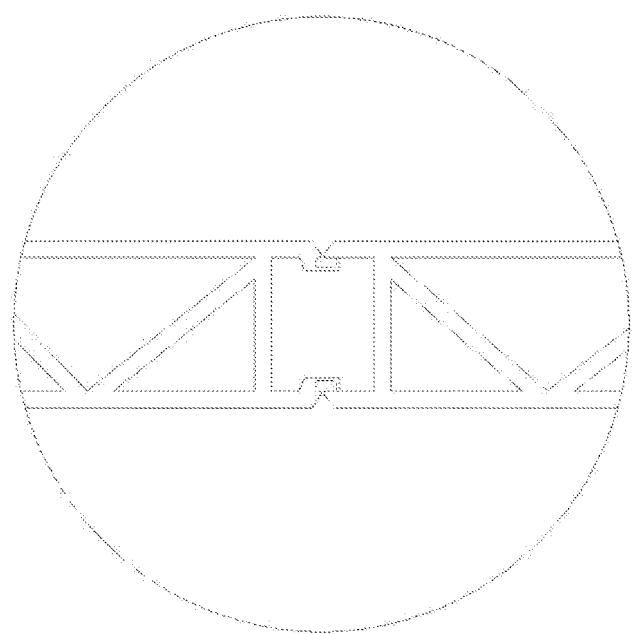
FIG. 15 is a partial enlarged view of the sidewall profile assembly in the Embodiment 1 of the present invention.

FIGS. 14 and 15 are respectively the assembly drawing of the sidewall profiles and the partial enlarged drawing of the sidewall profiles assembly. As shown in the FIG. 14, locked the hollow extruded aluminum alloy profiles after the hollow extruded aluminum alloy profiles mounted with the self-positioning device V are placed in the self-positioning locking device VII-4, and then control the assembly geometric relationship of welding grooves of the profiles through the accurate movement of the rodless cylinder track platform VII-3-2. The specific installation sequence is as follows: first, placing the window lower profile IV-4 mounted with the self-positioning device V to the self-positioning locking device VII-4 on the fixing seat VII-3-3, and completely fixing this position to make it have a definite positional relationship; then, placing the lower side-beam profile IV-5 mounted with the self-positioning device V on the self-positioning locking device VII-4 on the rodless cylinder track platform VII-3-2, accurately adjusting the position of the rodless cylinder track platform VII-3-2 to realize the assembly of lower side-beam profile IV-5 and the window lower profile IV-4; next, placing the window middle profile IV-3 mounted with the self-positioning device V on the self-positioning locking device VII-4 on the rodless cylinder track platform VII-3-2, accurately adjusting the position of the rodless cylinder track platform VII-3-2 to realize the assembly of the window middle profile IV-3 and the window lower profile IV-4; then, placing the window upper profile IV-2 mounted with the self-positioning device V on the self-positioning locking device VII-4 on the rodless cylinder track platform VII-3-2, accurately adjusting the position of the rodless cylinder track platform VII-3-2, to realize the assembly of the window upper profile IV-2 and the window middle profile IV-3; finally, placing the upper side-beam profile IV-1 mounted with the self-positioning device V on the self-positioning locking device VII-4 on the rodless cylinder track platform VII-3-2, accurately adjusting the position of the rodless cylinder track platform VII-3-2, to realize the assembly of the upper side-beam profile IV-1 and the window upper profile IV-2. Since the window lower profile IV-4 already having a certain position, the assembly benchmarks of the window middle profile IV-3 and the lower side-beam profile IV-5 both are a center plane of the self-positioning device V of the window lower profile IV-4, the assembly benchmark of the window upper profile IV-2 is the center plane of the self-positioning device V of the window middle profile IV-3, and the assembly benchmark of the upper side-beam profile IV-1 is the center plane of the self-positioning device V of the window upper profile IV-2; thus, the five hollow extruded aluminum alloy profiles can complete accurate positioning, which facilitates the subsequent programming of the position relationship of the gantry welding manipulator.

Figure 16:
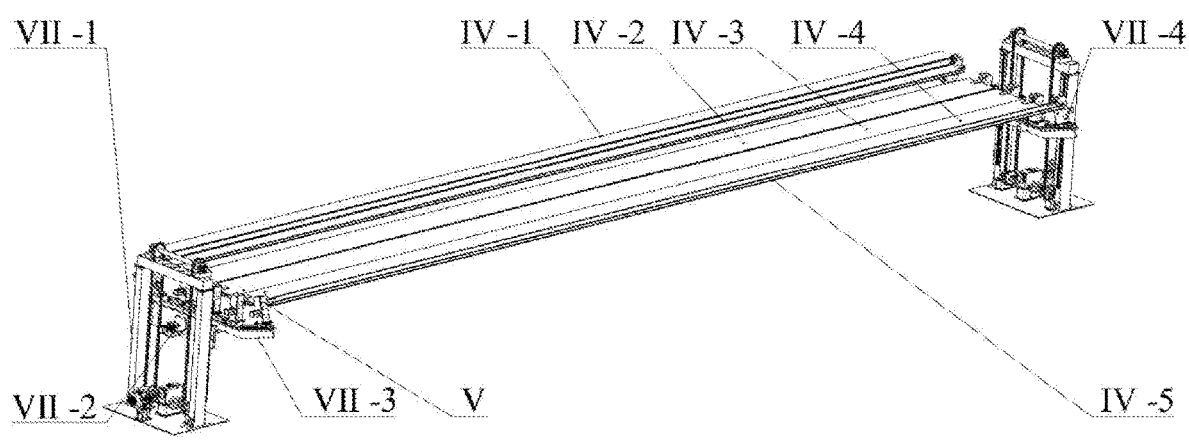
FIG. 16 is an axonometric diagram of the fixture for automatically assembly welding aluminum profiles and positive- and negative-positions overturn of assembled aluminum profile VII in the Embodiment 1 of the present invention.

FIG. 16 is an axonometric diagram of the fixture for automatically assembly welding aluminum profiles and positive- and negative-positions overturn of assembled aluminum profile VII, and as shown in the figure, the lifting mechanism VII-1 is responsible for lifting the sidewall hollow extruded aluminum alloy profile assembly IV of rail vehicle; because the traditional welding fixture needs a negative-position automatic welding station and a positive-position automatic welding station, and the supporting overturning device VII-2 is responsible for the overturning of the sidewall hollow extruded aluminum alloy profile assembly IV of the rail vehicle, so as to realize the positive- and negative-position welding on one station; the automatic assembling sidewall profile device VII-3 realizes the automatic and accurate assembly of the five profiles; the self-positioning locking device VII-4 is used to realize that the profile will not fall when turning and ensure that the position is fixed. At the same time, due to the large longitudinal span of the profile, there is necessary to set an auxiliary support mechanism between the aluminum profile automatic assembly and welding positive- and negative-position overturning fixtures VII, because the existing auxiliary support mechanism can meet its requirements, so it is not introduced in the present disclosure.

The invention claimed is:

1. A fixture for automatic assembly, overturning and welding of a sidewall aluminum profile of a rail vehicle, comprising a lifting mechanism, a supporting overturning device, an automatic assembling sidewall profile device and a self-positioning locking device;

the supporting overturning device is mounted on the lifting mechanism; the automatic assembling sidewall profile device is mounted on the supporting overturning device, and the automatic assembling sidewall profile device comprises a sidewall-shaped support steel beam and a rodless cylinder track platform and a fixing seat mounted on a top end of the sidewall-shaped support steel beam; the rodless cylinder track platform and fixing seat are mounted by the self-positioning locking device;

the self-positioning locking device comprises a self-positioning base and a locking device, the self-positioning base comprises an outer housing, two symmetrically set self-positioning supports are provided in the outer housing, and rollers are provided on faces of the two self-positioning supports which match with the sidewall aluminum profile of the rail vehicle and a V-shaped gap is formed between the rollers of the two self-positioning supports; the locking device is provided on a first side of the outer housing.

2. The fixture according to claim 1, wherein the locking device is a locking cylinder; and a hole is provided on the first side of the outer housing for a piston rod of the locking cylinder to pass through.

3. The fixture according to claim 1, wherein the lifting mechanism comprises a first lifting mechanism and a second lifting mechanism that is structurally the same as the first lifting mechanism, and both ends of the supporting overturning device are fixed to the first lifting mechanism and the second lifting mechanism respectively.

4. The fixture according to claim 3, wherein the first lifting mechanism and the second lifting mechanism are sprocket chain lifting mechanisms.

5. The fixture according to claim 3, wherein the supporting overturning device comprises a first supporting overturning mechanism and a second supporting overturning mechanism that is structurally the same as the first supporting overturning mechanism, the first supporting overturning mechanism is mounted on the first lifting mechanism, and the second supporting overturning mechanism is mounted on the second lifting mechanism.

6. The fixture according to claim 5, wherein the first supporting overturning mechanism and the second supporting overturning mechanism respectively comprises a motor, the motor is connected to a coupling, the coupling driving a shaft to rotate, the shaft driving a sun gear to rotate; a large gear ring is stationary, planetary gears mounted between the large gear ring and the sun gear and moving in a circular motion around the sun gear, the planetary gears being set 120° apart from each other along a circumferential direction, a turntable is connected to the planetary gears, and a supporting overturning connector is fixedly connected to the turntable to realize the rotation of the supporting overturning connector.

7. The fixture according to claim 1, wherein a design of the sidewall-shaped support steel beam is determined by a cross-section of the automatic assembly sidewall profile device mounted with the self-positioning locking device.

8. The fixture according to claim 1, wherein a working surface of each one of the two self-positioning supports is a curved surface; roller pin holes are provided on the working surfaces of the two self-positioning supports, and the roller pin hole is connected with a roller by a pin, an axis line of the roller is a horizontal line.

\* \* \* \* \*